June 25, 1968
S. GEWIRTZ
3,390,329
SIMPLIFIED APPARATUS FOR MEASURING
PRIMARY ELECTRICAL QUANTITIES
Filed April 30, 1964
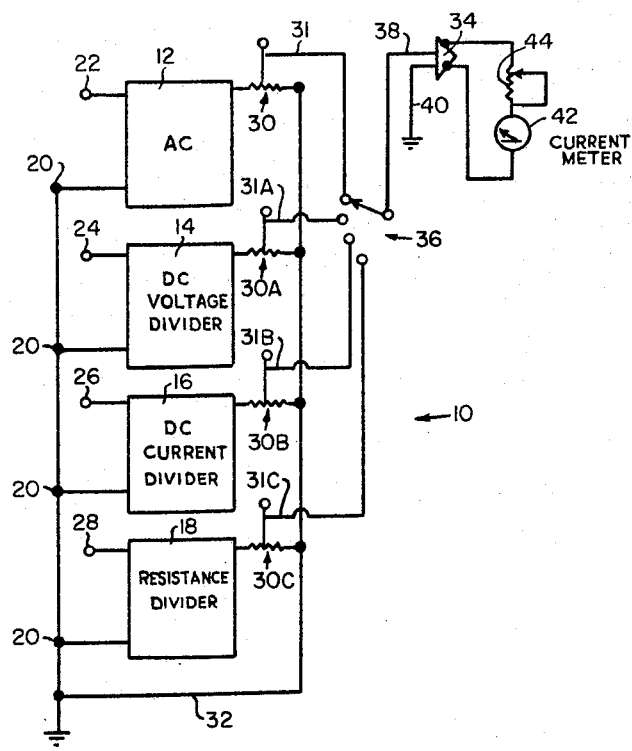
INVENTOR.
STANLEY GEWIRTZ
BY
ATTORNEY

United States Patent Office 3,390,329
Patented June 25, 1968

3,390,329
SIMPLIFIED APPARATUS FOR MEASURING
PRIMARY ELECTRICAL QUANTITIES
Stanley Gewirtz, New York, N.Y., assignor to Solid State
Systems, Inc., New York, N.Y.
Continuation-in-part of application Ser. No. 182,456,
Mar. 26, 1962. This application Apr. 30, 1964, Ser.
No. 363,883
6 Claims. (Cl. 324—115)

The present application is a continuation-in-part of my now abandoned application, Ser. No. 182,456, filed on Mar. 26, 1962 and entitled Simplified Means For Measuring Primary Electrical Quantities.

The present invention relates to the measurement of primary electrical quantities, such as current, voltage, resistance, capacitance, and inductance, and more particularly to simplified apparatus for accomplishing the above described functions with a minimum of calibration.

It is the main object of the present invention to provide a novel, simple, reliable, and relatively inexpensive gang of components which are collectively a multi-purpose metering apparatus, and wherein a particular feature of said gang is that it can be calibrated by means of a single known constant which is externally located.

All presently available vacuum tube volt meters or amplified multimetering devices comprise a series of variable resistors or rheostats which are located at either the input or output of a DC amplifier and are individually switch-selected for each function of the component circuit aggregate. These meters result in the cumulative addition of errors with the passage of time. These errors are usually the result of drift in the sensitivity of the DC amplifier and drift in the impedance of the calibrating source resistors or variable resistance elements.

Since the size and power requirements of portable measuring equipment, e.g., a vacuum tube volt meter (VTVM), a solid state volt meter (SSVM), or a transistorized portable laboratory (TPL), result in the utilization of a DC amplifier with inherent drift, the present invention is concerned with neutralizing both of the aforementioned sources of errors.

It is therefore an object of the present invention to provide an apparatus for the measuring of primary electrical quantities which can be externally calibrated to neutralize the drift in sensitivity of the DC amplifier employed in said apparatus.

It is another object of the present invention to provide potentiometers at the input of the DC amplifier of the measuring apparatus which eliminates the addition of errors in the measuring apparatus with the passage of time and thereby eliminates the need for calibrating source resistors or variable resistance elements.

These other objects, features and additions of the present invention will become more apparent when considered in conjunction with the following drawing which is a block diagram of the apparatus forming the present invention.

Referring now to the drawings, there is shown a gang of components which collectively comprise the multi-purpose metering apparatus 10 of the present invention. The components include an AC to DC converter and divider network 12, a DC voltage divider network 14, a DC current divider network 16, and a resistance divider network 18. The networks 12, 14, 16 and 18 have a first input terminal 20, which is connected to ground and is common to all of said networks, and a second input terminal 22, 24, 26 and 28, respectively. The output of said networks 12, 14, 16 and 18 have connected thereto one terminal of potentiometers 30, 30A, 30B and 30C, respectively; said potentiometers having arms 31, 31A, 31B and 31C, respectively, mechanically fixed thereon. The other terminals of said potentiometers are connected to ground by a common lead 32. The arms of the potentiometers are selectively connected to one of the input terminals of the DC amplifier 34 by switching means 36 and lead 38, the other input terminal of said amplifier being connected to ground by means of the lead 40 connected thereto. The output of the DC amplifier is connected to a current meter, or similar electrical readout device, 42 through a serially connected rheostat 44.

When an unknown DC voltage is to be measured, it is fed into the input terminals 20 and 24 of the DC voltage divider network 14, a predetermined portion of the output thereof is taken from the potentiometer 30A by means of the mechanically fixed arm 31A of said potentiometer and is fed to the input of the DC amplifier 34 by means of the switch 36 which connects the input terminal of said amplifier to said arm 31A, such unknown DC voltage being amplified in said amplifier 34 and its magnitude thence being indicated by the meter 42.

It is thus seen that the potentiometer 30A acts as a fixed ratio divider to feed a predetermined portion of the voltage across said potentiometer 30A to the input of the DC amplifier 34. This results from the fact that the arm 31A is mechanically fixed, and any change of the resistance value of the potentiometer, caused by the passage of time; i.e., by the aging of the potentiometer, does not change the ratio of resistance between the upper and lower arms of said potentiometer. Therefore, any change in the resistance value of the potentiometer, with the passage of time does not change the percentage of voltage taken from the potentiometer by the fixed arm and fed to the DC amplifier. This therefore eliminates the errors normally caused by changes in impedance of the calibrating resistance element with the passage of time. The same result is accomplished by the potentiometers 30, 30B and 30C, as concerns the measurement of the primary electrical quantities associated therewith.

The error due to drift in the sensitivity of the DC amplifier is neutralized by the variable resistor 44. A DC source of calibrating potential (not shown) is fed into the input terminals 20, 24 and the meter 42 is adjusted by means of the variable resistor 44 to indicate a full scale deflection, said full scale deflection corresponding to the value of the calibration potential.

It is thus seen that I have provided a system the accuracy of which is limited only by the accuracy of the calibrating potential and the linearity of the DC amplifier, and which is easily calibrated by a single variable resistor.

It should be noted that in present day multimeter devices, correction of the DC amplifier circuit to neutralize the drift in sensitivity necessitates recalibration of the calibrating source resistors or variable resistance elements. This operation requires that the multimeter be disassembled and reassembled and most often must be accomplished with special equipment, said meter thereby being removed from use for an appreciable time.

While I have shown and described a preferred embodiment of my invention, it will be obvious to those skilled in the art that many modifications and changes may be made therein without departing from the scope or spirit thereof as defined by the appended claims.

What is claimed is:

1. A circuit for measuring selectively a variety of primary electrical quantities, comprising a plurality of divider networks, a DC amplifier, a current measuring meter and means in series circuit with said meter and said amplifier for neutralizing drift in the sensitivity of said amplifier, terminal means for applying different electrical quantities to said divider networks, a plurality of ratio voltage dividers respectively connected to the outputs of said divider networks, and switch means between the respective ratio voltage dividers and said DC amplifier for selectively connecting each of said divider networks to said amplifier, so that the meter measures an electrical quantity applied to a selected network.

2. A circuit for measuring selectively a variety of primary electrical quantities, in accordance with claim 1 wherein, said means for neutralizing the drift in the sensitivity of the DC amplifier comprises a rheostat.

3. A circuit for measuring selectively a variety of primary electrical quantities, in accordance with claim 2 wherein, said rheostat is externally adjustable.

4. A circuit for measuring selectively a variety of primary electrical quantities, in accordance with claim 1 wherein, said divider networks are respectively an AC to DC converter and divider network, a DC voltage divider, a DC current divider and a resistance divider.

5. A circuit for measuring selectively a variety of primary electrical quantities, in accordance with claim 1 wherein, said ratio voltage dividers comprise potentiometers having mechanically fixed arms, whereby the voltage at the arms of said potentiometers are always a fixed percentage of the voltage applied across said potentiometers and independent of any change in the resistance value of said potentiometers.

6. A circuit for measuring selectively a variety of primary electrical quantities, in accordane with claim 4 wherein, said means for neutralizing the drift in the sensitivity of the DC amplifier comprises a rheostat adapted to adjust the meter to indicate full scale deflection when a known DC calibration potential is connected to the input terminals of said DC voltage divider.

References Cited

UNITED STATES PATENTS

| 2,558,282 | 6/1951 | Triplett | 324—115 X |
| 2,806,208 | 9/1957 | Giuffrida | 324—123 |

OTHER REFERENCES

Voltmeter, War Department Technical Manual TM11-1239, pp. 17–20.

RUDOLPH V. ROLINEC, *Primary Examiner.*

WALTER L. CARLSON, *Examiner.*

J. J. MULROONEY, *Assistant Examiner.*